Aug. 8, 1933.  R. D. WILEY  1,921,402
TAPE DRIVE
Filed June 25, 1931
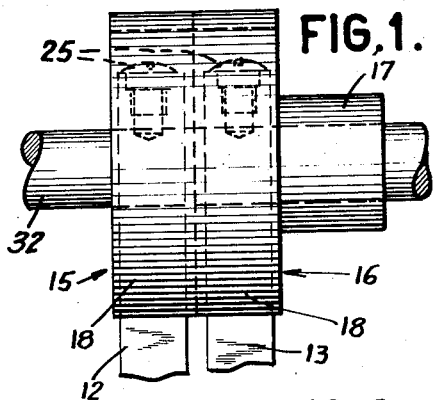
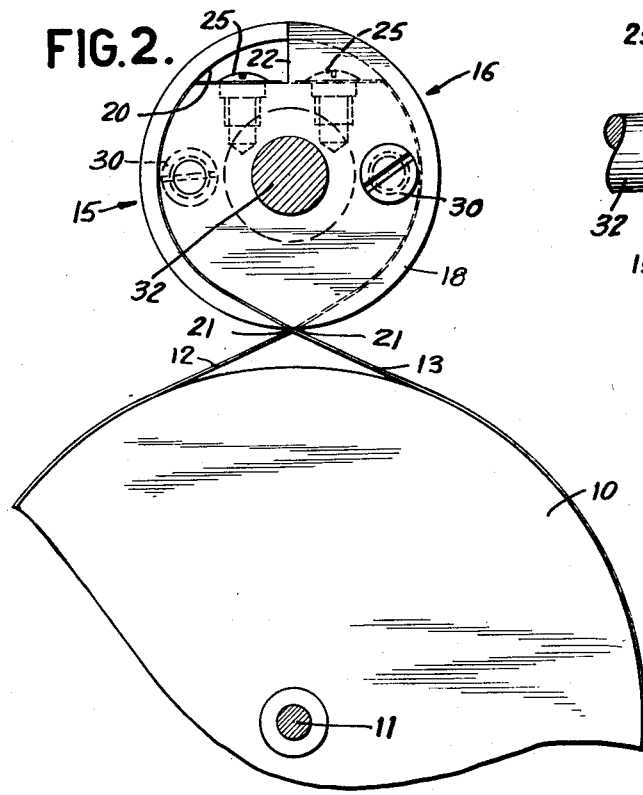
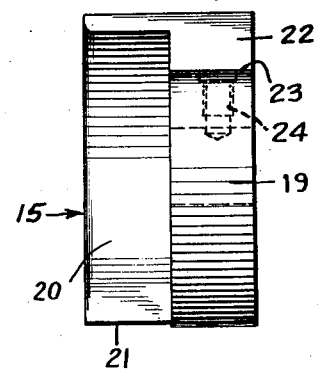
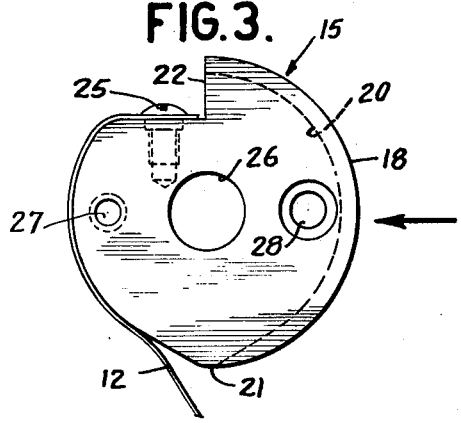
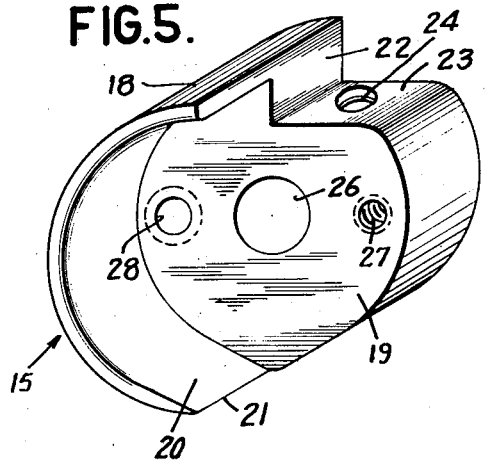
INVENTOR
R. D. Wiley
BY his ATTORNEY Patented Aug. 8, 1933

1,921,402

UNITED STATES PATENT OFFICE 1,921,402

TAPE DRIVE

Raymond D. Wiley, Dayton, Ohio, assignor to Dayton Scale Company, Dayton, Ohio, a Corporation of New Jersey Application June 25, 1931. Serial No. 546,776

5 Claims. (Cl. 74—21)

This case relates to driving means for shafts, particularly those of weighing or force measuring machines.

The object of the invention is to provide an improved ribbon or tape drive for shafts.

Further, the object is to provide a novel tape drive which will permit one or more revolutions of the shaft without detriment to the accuracy of the drive.

More specifically, the object is to provide novel means for securing a tape to a member so that the periphery of the member on which the tape is wound is completely uninterrupted.

Still further, an object is to provide a tape driven means consisting of two parts coacting to retain the tape between them.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the drawing:

Fig. 1 is a view of the shaft driving members assembled with the tapes.

Fig. 2 is an assembly view of the driving members with the tapes connecting them to the actuating pulley.

Fig. 3 is a side detail view of one of the driving members.

Fig. 4 is a front detail of this member, and

Fig. 5 is a perspective view of the same member.

Referring to the drawing in detail, 10 is part of a pulley fixed to an intermediate shaft 11 of a weighing scale. The pulley carries tapes or ribbons 12 and 13 located and movable in axially displaced planes in order to clear each other. Tape 12 is connected to a member 15 and tape 13 is connected to a member 16.

Members 15 and 16 are similar die-castings in every respect except that 16 has a hub 17 projecting therefrom. Figs. 3 to 5 show the member 15 in detail. Looking at the member 15 in the direction of the arrow, Fig. 3, it presents an unbroken substantially semi-circular periphery 18. From the other side, the member is seen to have a solid extension 19 and a flanged portion 20.

The periphery of the solid extension opposite periphery 18 is shaped substantially as one half of a heart-shaped member and is of lesser distance from the axis of member 15 than the inside of flange 20 by the thickness of tape 12 or 13 for a purpose which will be later brought out. The inside of flange 20 is also substantially heart-shaped, its lower end meeting the periphery 18 along a straight edge 21, the periphery 18 terminating just short of a full semi-circle.

The upper end of the periphery 18 intersects flat vertical wall 22, as viewed in the drawing, which extends downwardly in a radial direction until it intersects the exposed flat, horizontal top 23 of the solid extension 19. The top 23 has a countersunk threaded hole 24 to cooperate with a flat-head screw 25 (see Figs. 1 and 2). The solid extension 19 has a center hole 26 reamed therethrough. At one side of the center hole is a tapped hole 27 and at the other side a bore 28 countersunk at the outer end, as seen in Fig. 3.

Members 15 and 16 form complementary fitting parts, the solid extension 19 of one member seating within the flanged portion of the other member. Before assembling the members, ribbons 12 and 13 are fastened thereto by means of the screws 25 threaded into holes 24. The two members are then fitted together and, as shown in Fig. 2, the flange 20 of one member will fit over the solid extension 19 of the other member clamping the tapes between the adjacent surfaces. The tapes issue freely from the gap between the confronting edges 21 into engagement with pulley 10. The parts are held together with the inner flat sides of the solid extensions in contact by means of screws 30 (Fig. 2) passing through the bore 28 of one member and threaded into the hole 27 of the other member.

When assembled, the members and tapes form in effect a single driving unit having an uninterrupted circular periphery with a narrow slot through which issue two axially displaced tapes.

When pulley 10 rotates clockwise, tape 13 will positively drive the unit counterclockwise winding up tape 12 on member 15; when the pulley rotates counterclockwise, tape 12 will drive the unit counterclockwise, winding up tape 13 on member 16. Pulley 10 may rotate to such an extent that the tapes will wind more than once around the periphery of the unit, and this may be done without the tape encountering obstructions due to tape securing means or the like. In this way accuracy of drive may be obtained when the tapes are wound more than once around the unit.

After the driving unit is assembled with the tapes, shaft 32 is pressed into the hub 17 and thereby rigidly secured to the unit. The shaft 32 may carry an indicator or the like (not shown).

Obviously, the invention may be used for securing only one tape to a drive unit or any number of tapes by duplicating the solid and flanged portions.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

1. A device comprising a unit provided with two similar complementary parts, each having a projecting portion and a flange extending laterally of the projecting portion, means for securing the parts together with the projecting portion of each part received within the flange of the other part, tapes one between each flange and co-acting projecting portion, and means for securing the tapes to the unit.

2. A device comprising a rotatable unit including a member having a substantially semi-circular periphery and a solid extension, the periphery of the solid extension being at a less distance from the axis of the unit than the semi-circular periphery, and a complementary member for receiving the solid extension, the complementary member having a substantially semi-circular exterior which when both members are fitted to each other combines with the semi-circular periphery of the first-mentioned member to form a substantially circular uninterrupted surface, and a driving ribbon secured to one of said members and adapted to wind on aforementioned surface.

3. In a driving device, a pair of similar complementary substantially semi-circular members, each having a flange and solid extension side by side, the flange of one member being adapted to receive the solid extension of the other member in a manner to leave a channel between them, the channel being open at one end, and means for securing driving tapes to the solid portions to lie within the channels and extend through the opening in the channels exteriorly of the member.

4. In a device of the class described, a pair of members, each having a curved periphery, means for securing the members together with the curved peripheries following each other in the direction of their curvature to form in conjunction a substantially continuous curved exterior, and means for securing a flexible driving element to the interior of the joined members, the element being adapted to extend exteriorly of the joined members and to wind up in succession on the curved peripheries of said members.

5. A device comprising a unit provided with two complementary parts one having an outer curved periphery extending for less than a complete curve and a convex portion opposite the periphery, the other part having a concave portion to receive said convex portion and an outer curved periphery extending for less than a complete curve, the outer curved portions of said parts following each other in the direction of curvature of the peripheries to form an exterior having a substantially complete and continuous curve, a flexible driving element located between the convex and concave portions and confined therebetween, and means for fixing the element to the interior of said unit, said element extending exteriorly of the unit to be wound in a continuous direction successively around the joined peripheries of both parts of said unit.

RAYMOND D. WILEY.